UNITED STATES PATENT OFFICE.

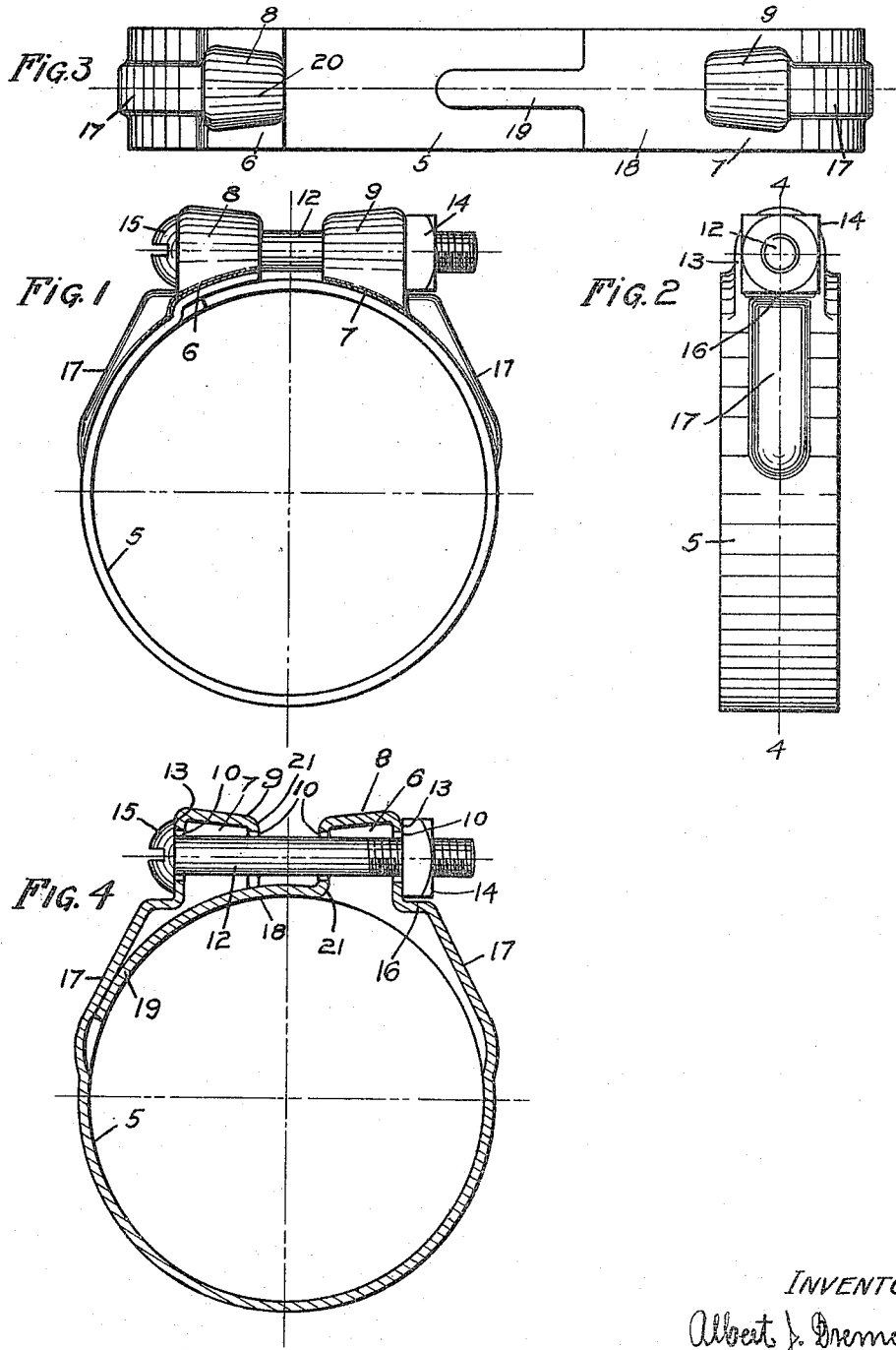

ALBERT J. DREMEL, OF RACINE, WISCONSIN.

HOSE-CLAMP.

1,221,425.　　　　Specification of Letters Patent.　　Patented Apr. 3, 1917.

Application filed June 3, 1916. Serial No. 101,472.

*To all whom it may concern:*

Be it known that I, ALBERT J. DREMEL, a citizen of the United States, and resident of Racine, in the county of Racine and State of Wisconsin, have invented new and useful Improvements in Hose-Clamps, of which the following is a description, reference being had to the accompanying drawings, which are a part of this specification.

The invention relates to hose clamps.

The invention is more particularly designed to provide a rubber hose clamp constructed from a single piece or band of sheet metal which has a portion struck up therefrom adjacent its end for receiving the clamping bolt and providing a strong construction at the meeting ends of the clamp where it is most necessary.

It is common practice to make hose clamps of a single piece of sheet metal bent to form a band and the ends being bent at an angle to the band for receiving the clamping bolt, but these constructions are objectionable for the reason that the bent ends cannot stand the strain exerted upon them by the clamping bolt. To obviate this difficulty, I have formed the ends for receiving the clamping bolt in the form of a box struck up from the band which not only reinforces the band at the points where it is most needed, but also, due to their formation, form a seat for the nut for the bolt. I further provide a tongue at one end of the band which seats within a struck up recess in the other end of the band and serves to more firmly grip the hose to which the clamp is applied.

The invention further consists in the several features hereinafter set forth and more particularly defined by claims at the conclusion hereof.

In the drawings:

Figure 1 is a side view of the device embodying the invention;

Fig. 2 is an end view thereof;

Fig. 3 is a plan view of the device showing the band in open position with the clamping bolt removed;

Fig. 4 is a section taken on line 4—4 of Fig. 2.

The device comprises a sheet metal band 5 having its ends 6 and 7 embossed or pressed up to form box-like portions 8 and 9, each provided with alined apertures 10 for receiving the clamping bolt 12. Each box-like portion has a plane outer end 13 for receiving either the nut 14 or the head 15 of the bolt 12 and these pressed up portions are so formed as to provide a square shoulder or seat 16 for one of the flat sides of the nut 14. Reinforcing ribs 17, struck up from the band, extend from the portions 8 and 9 for a portion of the length of the band. The end 7 is provided with an extension 18 having a tongue 19 which is adapted to slidably engage and seat in the embossed guide formed by the rib 17 adjacent the end 6.

The box-like portions 8 and 9 form a very strong construction for receiving the clamping bolt 12 and the sides 20 of said portions connected to the ends 13 and 21, respectively, reinforce said ends so that there is no liability of the ends bending in or giving way.

The clamp is placed around that portion of the hose to be secured by either slipping it on or spreading it apart for positioning it thereon and the ends 6 and 7 are then brought together and the clamping bolt 12 passed through the alined apertures 10. The nut 14 may be seated on the shouldered portion at either end of the clamp and the bolt is then screwed up on the nut, the nut and head of the bolt bearing against the struck up box-like ends and the tongue 19 passing in the guide formed by the rib 17 and assisting in properly securing the clamp to the hose.

The invention thus exemplifies a hose clamp made from a single piece of sheet metal having struck up reinforced bolt receiving ends through which the bolt passes to draw the ends of the band around the hose.

What I claim as my invention is:—

1. A hose clamp comprising a sheet metal band having struck up hollow box-like end portions, said box-like portions having front, rear, top and opposite side walls, the front and rear walls having alined apertures therein, and a clamping bolt passing through said apertures for drawing the ends of the band together.

2. A hose clamp comprising a sheet metal band having struck up hollow box-like end portions, said box-like portions having front, rear, top and opposite side walls, said front and rear walls having alined apertures therein, said band having embossed reinforcing ribs adjacent said end portions extending from intermediate portions of the band to the rear ends of said box-like end to form square shouldered bolt seats, one of the ends of said band carrying a tongue adapted to seat within the reinforcing rib of the other end of the band, and a clamping bolt passing through said apertures for drawing the ends of the band together and the tongue to a position within said rib.

In testimony whereof, I affix my signature.

ALBERT J. DREMEL.

Copies of this patent may be obtained for five cents each, by addressing the "Commissioner of Patents, Washington, D. C."